Dec. 3, 1935.  G. M. DEMING  2,023,008
REGULATING AND METERING APPARATUS
Filed April 22, 1933  2 Sheets-Sheet 1
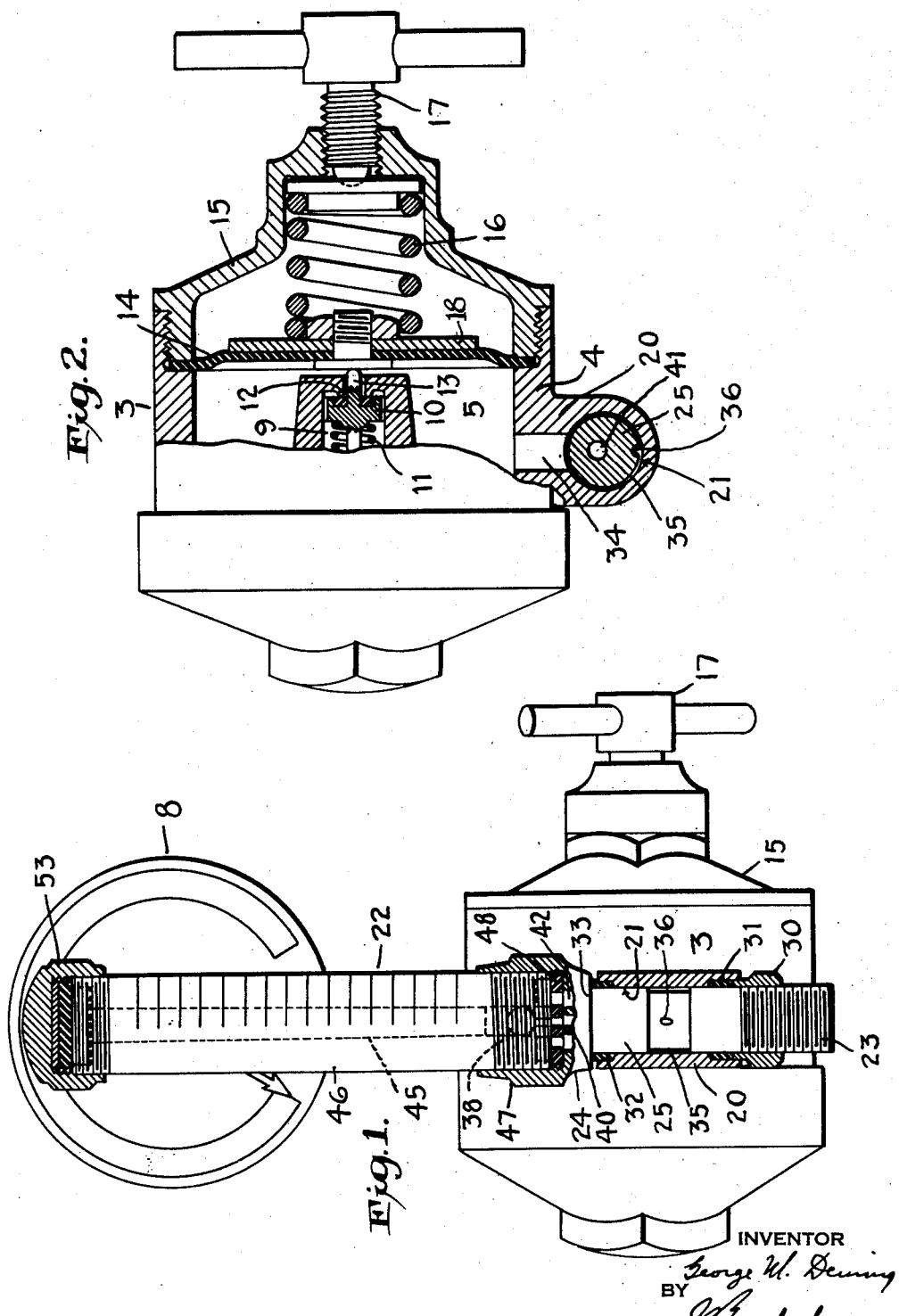
INVENTOR
George M. Deming
BY
ATTORNEY Dec. 3, 1935. G. M. DEMING 2,023,008
REGULATING AND METERING APPARATUS
Filed April 22, 1933 2 Sheets-Sheet 2
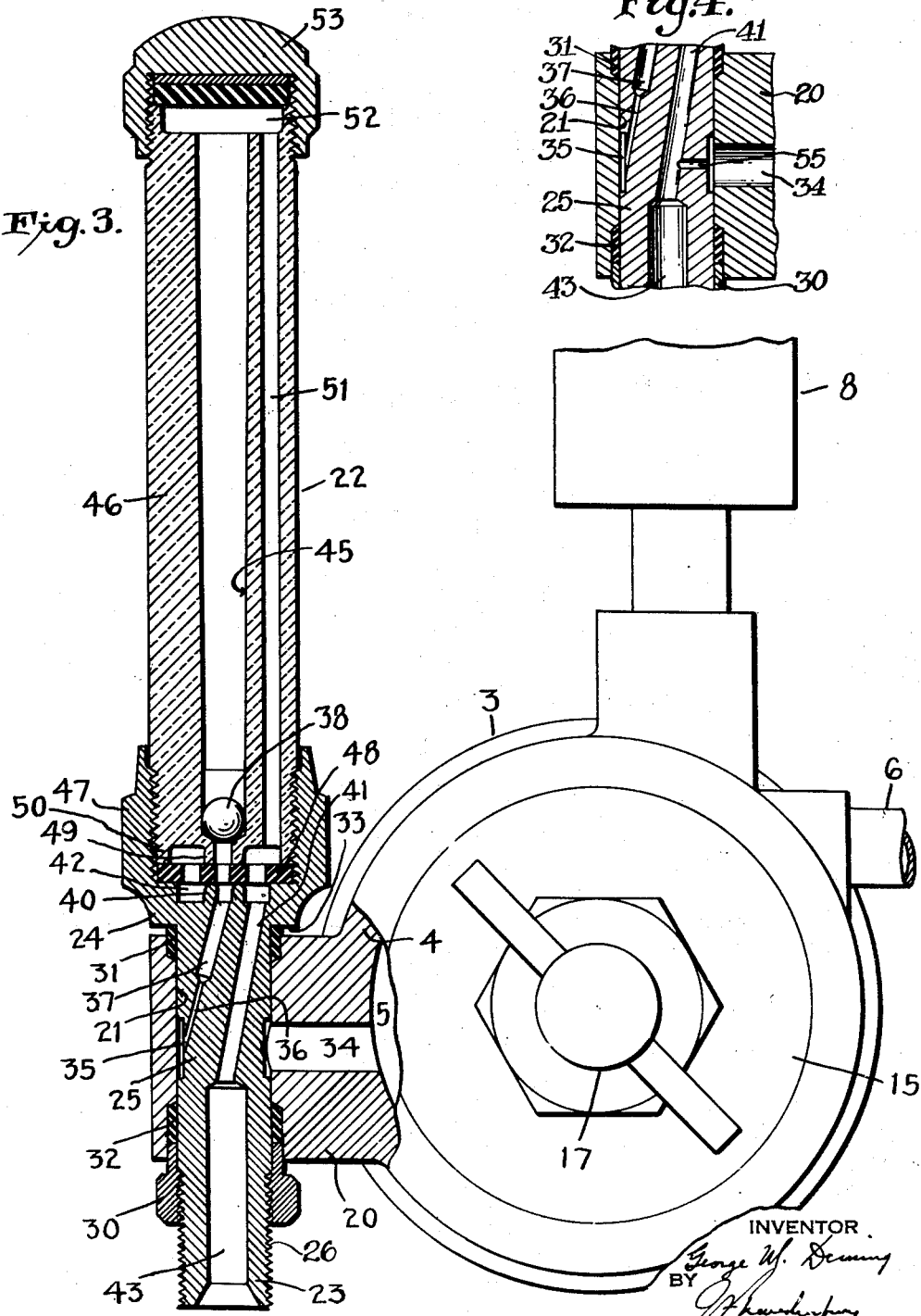

Patented Dec. 3, 1935

2,023,008

UNITED STATES PATENT OFFICE 2,023,008

REGULATING AND METERING APPARATUS

George M. Deming, East Orange, N. J., assignor to Air Reduction Company, Incorporated, New York, N. Y., a corporation of New York Application April 22, 1933, Serial No. 667,344

10 Claims. (Cl. 73—167)

The invention relates to an instrument for reducing pressure on a gas flow and for affording readings of the rate of flow. The invention may also be said to relate to an instrument for regulating, maintaining, and indicating the rate at which gas is discharged at reduced pressure from a source the pressure of which is not constant. The invention may also be said to relate to an instrument for keeping uniform reduced pressures derived from a declining high pressure and for metering the gas delivered from the instrument. A special object of the invention is to provide a more perfect, safe and reliable means than has hitherto been available for regulating and controlling the administration of oxygen to patients. Objects of the invention include simplicity of construction, ease of manufacture and of assembling and disassembling, compactness, sturdiness of the instrument in use, reliability of the regulation of the pressure and flow, accuracy of readings, facility with which the adjustment of the outflow may be regulated, and convenience in attaching a wash-bottle or other part through which the gas passes from the instrument.

The instrument embodies a pressure regulating means and a flow-meter of the float-gauge type built together in a compact and unitary manner and constituting one instrument. The features of construction, relation and combination whereby the objects of the invention are realized can best be described in the body of the specification.

The invention also relates to features that are new and useful in flow-meters of the stated type.

In the accompanying drawings forming part hereof:

Fig. 1 is a front elevation of the preferred embodiment of the invention, portions being shown in section;

Fig. 2 is a view partly in top plan and partly in horizontal section;

Fig. 3 is a view, on a larger scale, partly in side elevation and partly in vertical section; and Fig. 4 is a fragmentary vertical section illustrating a modification.

The gas-pressure regulator has a hollow body 3, the wall 4 of which encircles a low-pressure or reduced-pressure chamber 5. A variety of types of pressure regulators may be used, though a two-stage reduction regulator such as disclosed in my Patent 1,948,027, granted Feb. 20, 1934, is especially desirable. The high-pressure inlet 6 of the regulator is adapted to be connected to the outlet of an oxygen cylinder. 8 is a high-pressure gauge. A low-pressure gauge need not be provided.

The first stage of the regulator, its diaphragm, valve and regulating spring, contained within the left-hand end of the casing, are not shown, since the specific organization of the pressure regulator is not essential to the invention. Indeed the space 9 shown in Fig. 2 may represent either a portion of the inter-stage cavity of a two-stage regulator or a portion of the high-pressure space of a single-stage regulator. For purpose of illustration it has been thought sufficient to show a valve member 10 urged by a light spring 11 toward a nozzle lip surrounding an orifice 12, this valve member having a pin 13 which extends into contact with a button on a diaphragm 14. This diaphragm is clamped in a familiar manner between the main body of the regulator and a spring-case 15, so that the diaphragm forms a flexible wall of the low-pressure chamber 5. A strong regulating spring 16, adjustable by a hand screw 17, bears against a plate 18 backing the diaphragm, this spring acting to unseat the valve member whenever the pressure in the chamber 5 acting on the diaphragm, counter to the regulating spring, tends to fall below a definite value.

A function of the pressure regulator in the combined instrument of this invention is to maintain a constant, adjustable, reduced gas pressure, which will cause the gas to be delivered at a constant, adjustable rate of flow. This rate of flow is to be metered or indicated, and the invention relates particularly to the combining of the pressure regulator and a float-gauge flow-meter in one compact and durable instrument, which will accurately regulate and maintain the flows and afford precise and reliable readings of the rates of flow. The pressure regulator thus becomes a means for holding and adjusting the rate of flow as shown by the meter, the meter being responsive to the adjustment of the screw 17.

The preferred construction is as follows:

An external projection 20 is formed integral with the circular wall 3 of the regulator body. This projection has a socket opening 21 extending through it, the relation of this socket opening to the inlet connection 6, by which the instrument is supported from the gas cylinder, being such that the socket is vertical. Such projection constitutes the most advantageous form of fitting or receptacle for holding the float-gauge 22 and the outlet 23 of the instrument in close coupled relation to the regulator, but the form may be varied.

A float-gauge base 24 has a shank 25 which is inserted from above into the socket of the receptacle 20. The lower portion 23 of this shank constitutes an outlet nipple extending downward below the receptacle, whereas the float-gauge extends upward from the receptacle. This is a desirable relation for a number of reasons, among which may be mentioned the fact that it is a great convenience to have a vertical outlet to which a wash-bottle, such as used for humidifying oxygen for medical purposes, can be applied from beneath. It will be understood, however, that the outlet is equally convenient for the attachment of a hose or other conduit. The outlet nipple may be provided with external screw threads or with other formations to receive the wash-bottle or such other part as may be applied to the outlet.

The float-gauge and outlet unit are secured in the receptacle by a nut 30 that screws on the threads 26, and this same means is made to serve to draw up gas-tight joints at the top and bottom of the receptacle. For this purpose the upper and lower ends of the socket through the receptacle are preferably enlarged to receive gaskets 31 and 32. When the nut is tightened it presses upward against the gasket 32 and simultaneously draws a shoulder 33 of the float-gauge base down on the gasket 31, with the result that both gaskets are compressed and insure gas-tight upper and lower joints between the float-gauge base and the receptacle.

Gas from the chamber 5 passes through a duct 34 in the wall 4 of the regulator and the projection 20 of this wall to the socket 21 of the receptacle, at a point between the upper and lower seals that have just been described. At this region the gas enters an exceedingly shallow annular recess formed between the shank 25 and the socket. This recess is preferably made by relieving the mid-portion of the shank. Such a recess affords free passageway for the gas, since its dimension parallel with the axis of the shank is considerable as compared with its radial depth, but its shallowness radially enables it to serve effectively as a means for keeping foreign particles that are sometimes carried by the gas from passing onward. In other words, the clearance is sufficient for the gas flow but so restricted in one direction that it will hold back solid particles. A recess about ½" in width parallel with the axis and 0.010" deep radially is effective.

From the recess 35 the gas passes upward in the shank through a fine drill hole 36, which may open into a larger bore 37. The fine passage 36 constitutes a constriction which insures that a considerable pressure will have to be developed within the low-pressure chamber 5 of the regulator in order to develop a flow high enough to correspond to the maximum range of the float-gauge. This means that a considerable motion of the adjusting screw 17 is required to cause the float indicator 38 to move from the bottom of the gauge to the top, or vice-versa, when gas is flowing. The advantage of this is that the adjustment of the instrument does not call for undue manipulative skill and it is, therefore, easy to adjust the outflow to any definite value as indicated by the float-gauge.

The shallow recess 35, by restraining solid particles, keeps the fine bore 36 from becoming clogged.

The upper end of the communication passage 36, 37 in the float-gauge base opens within an annular lip 40. Another diagonal passage 41 drilled in the base and its shank serves to conduct gas from a recess 42 around the lip 40 to the outlet cavity 43 of the nipple 23.

Other features of novelty in the float-gauge will now be described. As is well known, a flow-meter of the float-gauge type has a tapered bore which becomes gradually larger from the bottom to the top and in which a float is supported by the upwardly flowing gas stream at a height dependent upon the rate of flow. In the float-gauge forming part of my invention the tapered bore or passage 45 is formed in a heavy-walled transparent column 46, which may be made advantageously of known transparent condensation products. The float 38 serves as the indicator, appearing through the transparent wall of the float bore, which wall is graduated in liters per minute at 70° F., or in terms of other units at other temperature. The float is preferably a ball, and may be of metal or other material. It will be understood that the angle of taper of the bore 45 should be properly selected in accordance with the specific gravity of the material used for the float. The float is preferably retained in the transparent column, if the latter is removed, by means of a seat on which the float rests when no gas is passing.

The lower end of the column 46 is threaded to screw into a cup 47 formed at the top of the float-gauge base, and an apertured washer 48 may be interposed between the lower end of the column and the bottom of the cup to insure a gas-tight joint which prevents leakage as between up-flowing and down-flowing gas streams and between these streams and the outside atmosphere. The bottom of the column may have a central annular lip 49, corresponding to the lip 40 on the bottom of the cup, and an outside lip 50.

A feature of the invention is that the gas is returned from the top of the float-bore 45 downwardly to an outlet which is below the float-gauge and preferably below the receptacle 20. For this purpose a down-take passage is provided, which the gas enters after leaving the float-bore and through which it is conducted downwardly. The presence of this passage may be contrived in specifically different ways. The most advantageous construction is one in which a longitudinal passage 51 is drilled eccentrically, in the thickness of the wall of the column. The upper end of this passage is open to a chamber 52 formed between the upper end of the transparent column and a cap 53 screwed thereon, and its lower end communicates with the chamber 42 and with the outlet passage 41, 43.

It is not necessary that all of the gas flow pass to the outlet by way of the float-bore 45. In ratio meters of the float-gauge type there is a by-pass for part of the flow. If part of the gas is by-passed, as by means of the passage 55 shown in Fig. 4, a float 38 of relatively light material may be used without necessitating undue increase in the taper and diameter of the float-bore 45. Balls of condensation product material or the like can be obtained in color, and such colored floats show through the transparent column more noticeably than a metal ball. Metal floats might be lacquered, but that is scarcely practical since it is necessary to hold the floats accurately to size.

The operation of the instrument has been made clear in connection with the description. Briefly, the regulator reduces the pressure of the oxygen or other gas and holds the reduced pressure constant while the cylinder pressure or other high source pressure changes. The reduced pressure and consequently the rate of discharge from the instrument can be adjusted by the screw 17. The gas flow passes by way of passages 34, 36, 37 to the lower end of the float-bore 45 in the transparent column 46 and flows upwardly in this bore, causing the float 38 to stay at a height, which in connection with the graduations on the column gives the rate of discharge. From the top of the column, the gas flows through the downtake passages 51, 41, 43 to a wash-bottle or to a hose connected with the outlet 23.

Since numerous changes may be made without departure from the invention, it is desired that the description and illustration be regarded as illustrative rather than limiting.

I claim:

1. A unitary instrument for supplying gas at substantially uniform and reliably indicated rates of delivery, said instrument comprising a body having a high-pressure inlet and containing a reduced-pressure chamber and diaphragm-controlled valve means for keeping the pressure in said chamber substantially constant notwithstanding change in inlet pressure, a vertical receptacle integral with the encircling wall of said body, a duct extending from said reduced-pressure chamber into the interior of said receptacle, a float-gauge socketed in said receptacle and in communication with said duct, and an outlet from the instrument associated with said float-gauge and receptacle.

2. A unitary instrument for supplying gas at substantially uniform and reliably indicated rates of delivery, said instrument comprising a pressure-regulator, a vertical receptacle extending from the side of the body of said regulator and immediately adjacent thereto and connected by a duct with the reduced-pressure space of the regulator, and a float-meter and a gas outlet combined in one unit detachably mounted in said receptacle.

3. A unitary instrument for supplying gas at substantially uniform and reliably indicated rates of delivery, said instrument comprising a pressure-regulator, a fitting extending from the side of said regulator and immediately adjacent thereto and connected by a duct with the reduced-pressure space of the regulator, a float-gauge carried by said fitting and extending upward therefrom, said float-gauge having a tapered float-bore in communication with said duct, an outlet nipple extending downward from said fitting, and means for returning gas that passes upward through said float-bore downward to said outlet nipple.

4. An instrument comprising a pressure-regulator having a vertical repectacle thereon and a duct connecting said receptacle with the reduced-pressure space of the regulator, a float-gauge base set in said receptacle, a transparent column having a tapered bore containing a float, the lower end of said column being applied to the top of said base, two passages in said base, one of said passages being a communication passage conducting gas from said duct to the lower end of said float-bore, the other pasage being for outlet, and means for conducting gas downward from the top of said tapered bore to said outlet passage.

5. An instrument comprising a pressure regulator having a vertical receptacle thereon and a duct connecting the interior of said receptacle with the reduced pressure space of the regulator, a float-gauge having a base extending through said receptacle, said base having a passage fed by said duct and another passage through which the gas passes from the float-gauge, means whereby the upper and lower parts of said base fit with a tight joint against said receptacle, and means, comprising a nut threaded on the lower portion of said base, serving to draw the upper joint tight at the same time that the tight lower joint is made, this nut constituting the means for securing the float-gauge to the receptacle on the regulator.

6. An instrument as set forth in claim 4, wherein an annular recess is formed between said base and the interior of said receptacle to provide communication between said duct and said communication passage, said annular recess being constructed to afford so narrow a clearance as to be effectual in keeping foreign particles from being carried into said communication passage.

7. A unitary instrument for supplying gas at substantially uniform and reliably indicated rates of delivery, comprising a pressure regulator having a body, a vertical receptacle extending from the side of said body, there being a duct directly connecting the interior of the body with the interior of the receptacle, a float-gauge base having a stem socketed in said receptacle and having an upgoing passage fed by said duct and also a downgoing passage, a float-gauge column mounted on said base and provided with a tapered float-bore communicating with said upgoing passage and with a downtake passage communicating with said downgoing passage, and a downwardly directed outlet at the bottom of said receptacle and stem.

8. An instrument for supplying gas at substantially uniform and reliably indicated rates of delivery, comprising a pressure regulator having a body and an adjustment organ, a vertical receptacle on said body, there being a duct directly connecting the interior of the body with the interior of the receptacle, a float-gauge base having a stem socketed in said receptacle and having an upgoing passage fed by said duct and also a downgoing passage, a float-gauge column mounted on said base and provided with a tapered float-bore communicating with said upgoing passage and with a downtake passage communicating with said downgoing passage, and an outlet communicating with said downtake passage; said upgoing passage of the stem being restricted, and there being an annular passage formed between the stem and the interior of the receptacle to connect said upgoing passage with said duct, said annular passage being extensive in the vertical dimension and having an extremely small radial dimension.

9. A unitary instrument for supplying gas at substantially uniform and reliably indicated rates of delivery, comprising a pressure regulator having an adjustment organ, a float-gauge on the regulator, an outlet, and a passage which conducts gas from the pressure regulator to the float-gauge and which contains a fine restriction, whereby adjustment of the instrument by means of said organ for any desired rate of delivery reflected by the float-gauge is facilitated.

10. A float-gauge, comprising a receptacle having an admission duct, a float-gauge column, a float-gauge base supporting said column and set in said receptacle and having a passage fed by said duct, said passage being restricted, and there being an annular recess formed between said base and the interior of the receptacle to provide communication between said duct and said passage, said annular recess being constructed to afford a clearance so narrow as to be effectual in keeping foreign particles from being carried to said restricted passage.

GEORGE M. DEMING.